(12) United States Patent
Callaghan (10) Patent No.: US 6,498,588 B1
(45) Date of Patent: Dec. 24, 2002

(54) MULTIBAND VEHICLE ANTENNA

(75) Inventor: Peter Callaghan, Kent (GB)

(73) Assignee: Harada Industries ( Europe) Limited, Birmingham (GB)

( * ) Notice: Subject to any disclaimer, the term of this patent is extended or adjusted under 35 U.S.C. 154(b) by 0 days.

(21) Appl. No.: 09/719,801

(22) PCT Filed: Jun. 11, 1999

(86) PCT No.: PCT/GB99/01856
§ 371 (c)(1),
(2), (4) Date: Mar. 9, 2001

(87) PCT Pub. No.: WO99/66587
PCT Pub. Date: Dec. 23, 1999

(30) Foreign Application Priority Data

Jun. 17, 1998 (GB) .............................. 9813129

(51) Int. Cl.⁷ ................................. H01Q 1/32
(52) U.S. Cl. ...................... 343/713; 343/711; 343/767
(58) Field of Search ................ 343/711, 712, 343/713, 714, 767, 845, 846, 847, 848, 849

(56) References Cited

U.S. PATENT DOCUMENTS

| | | | |
|---|---|---|---|
| 4,721,963 A | * | 1/1988 | Nagy et al. .................. 343/711 |
| 5,714,961 A | | 2/1998 | Kot et al. .................... 343/769 |
| 5,898,407 A | * | 4/1999 | Paulus et al. ................ 343/713 |

FOREIGN PATENT DOCUMENTS

| | | |
|---|---|---|
| DE | 4125898 A | 2/1993 |
| DE | 19513263 A | 10/1996 |
| DE | 19730173 A | 1/1999 |
| EP | 0375415 A | 6/1990 |
| EP | 0375416 A | 6/1990 |
| EP | 0561272 A | 9/1993 |
| EP | 0760537 A | 3/1997 |
| EP | 0899811 A | 3/1999 |
| JP | 59-196606 | 11/1984 |

OTHER PUBLICATIONS

Kitsuregawa et al., Antenna Beam Shifting by Dual Modes, Aug. 21, 1996, Summary and Introduction.

* cited by examiner

*Primary Examiner*—Don Wong
*Assistant Examiner*—Shih-Chao Chen
(74) *Attorney, Agent, or Firm*—Pennie & Edmonds LLP (57) ABSTRACT

A road vehicle antenna includes a slot defined by an aperture in an electrically-conductive structure of the vehicle body and a further conductive structure disposed in the aperture, and a plurality of antenna feeds positioned so that the slot is excited in a first mode and simultaneously in at least one higher-order mode. The feeds are combined such that the antenna exhibits a diversity of radiation patterns in excess of the number of feeds. The antenna may be formed by a conductive area of a window and the surrounding window frame.

17 Claims, 7 Drawing Sheets

MULTIBAND VEHICLE ANTENNA

BACKGROUND OF THE INVENTION

This invention relates to antennas for use in road vehicles.

Most vehicles today carry electronic equipment requiring an antenna. This requirement is currently exceeding the demands of simple FM and AM radio reception with rapid growth in the need for TV reception, satellite GPS reception for navigation systems, mobile phone antennas and future needs such as road toll collection, satellite phone, DAB, etc. Coupled with this increasing number of systems is a demand for 'dynamic' reception to overcome multipath and fading effects when mobile, at FM and TV frequencies in particular, requiring a number of antennas for diversity operation. Also there is pressure from the automobile stylists to integrate the antennas into the bodywork of the car so that the vehicle is aesthetically pleasing whilst also offering improved security and reliability of the antennas. In this application a screen antenna design concept is presented which aims to met these requirements, at least in its preferred embodiments.

A number of screen antenna designs are already available. For instance it has been proposed to use wire elements integrated with the heater grid or to modify the heater grid in order to provide a plurality of FM antennas.

BRIEF SUMMARY OF THE INVENTION

The invention provides a road vehicle antenna comprising a slot defined by an aperture in an electrically-conductive structure of the vehicle body and a further electrically-conductive structure disposed within said aperture, the antenna having a plurality of antenna feeds electrically coupled to the slot, characterized by a said antenna feed being coupled to the slot at a position where a first excitation mode of the slot and at least one higher-order excitation mode of the slot each have a non-null value, and by control circuit means for controllably connecting a said feed or a combination of said feeds to a load so that in use the antenna exhibits a number of selectable radiation patterns in excess of the number of feeds.

The slot may be formed between eg. door boot or bonnet lid and its surrounding structure, or between a window frame (eg. a front or rear screen) and a conductive region or pattern in or upon the window glass, or some other body part having a conductive region, and its surrounding structure.

In the preferred embodiments, the basic approach is to capitalise on the heater grid (or corresponding electrically-conductive transparent film) which together with the window frame forms a slot around the periphery of the screen. This slot is excited using mode theory to form a number of coincident slot antennas and hence diversity operation.

We use mode theory to show such a slot can be excited in a number of ways to provide diversity, including having two antennas concurrently at FM and also providing antennas at other bands. The approach is not restricted to transparent conductive film but can be utilised with a conventional screen containing a heater grid.

The invention is in principle applicable to both receiving and transmitting antennas, and the claims are to be construed as extending to either or both.

Other features of the invention are set out in the subordinate claims, which are deemed repeated here as consistory clauses. Any of these features may be incorporated into the invention, singly or in combination, regardless of whether the current claim dependencies indicate such combination.

BRIEF DESCRIPTION OF THE DRAWINGS

Other independent inventive aspects are constituted by any novel feature or combination of features, whether or not identified as such, disclosed in this specification which term includes the claims and drawings.

European Patent Application 0 760 537 A2 (Flachglas Automotive GmbH) discloses a vehicle window having an electrically-conductive coating and an antenna slot formed between at least one edge of the window and the coating. Two or more coupling devices may be spaced apart along the slot region for coupling radio-frequency waves out of the antenna.

The Handbook of Antenna Design; Volume 2; Editors: A. W. Rudge, K. Milne, A. D. Olver & P. Knight; pages 228 to 237, discloses a theoretical analysis of the radiation patterns of phased array antennas.

The invention will now be described merely by way of example with reference to the accompanying drawings, wherein.

DETAILED DESCRIPTION OF THE INVENTION

Figure 1:
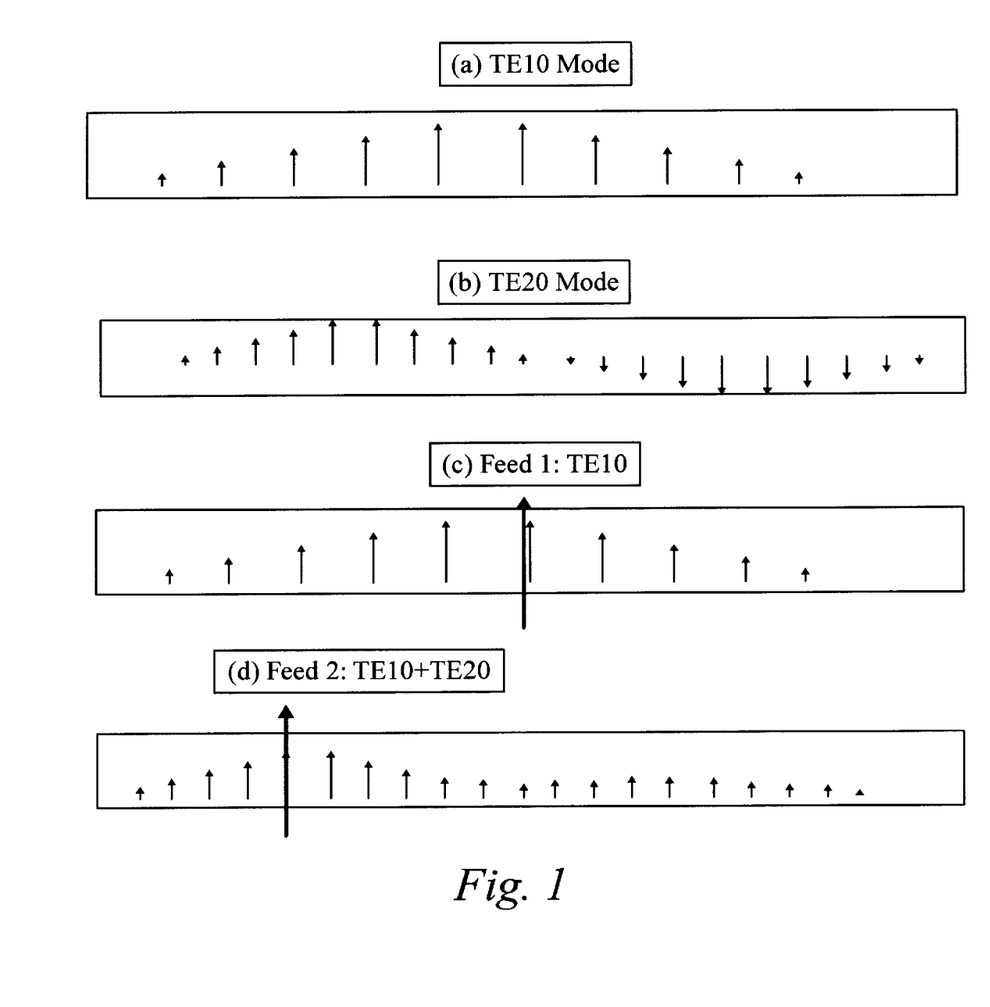
FIG. 1 shows electric field distributions in a long thin slot.
Figure 2:
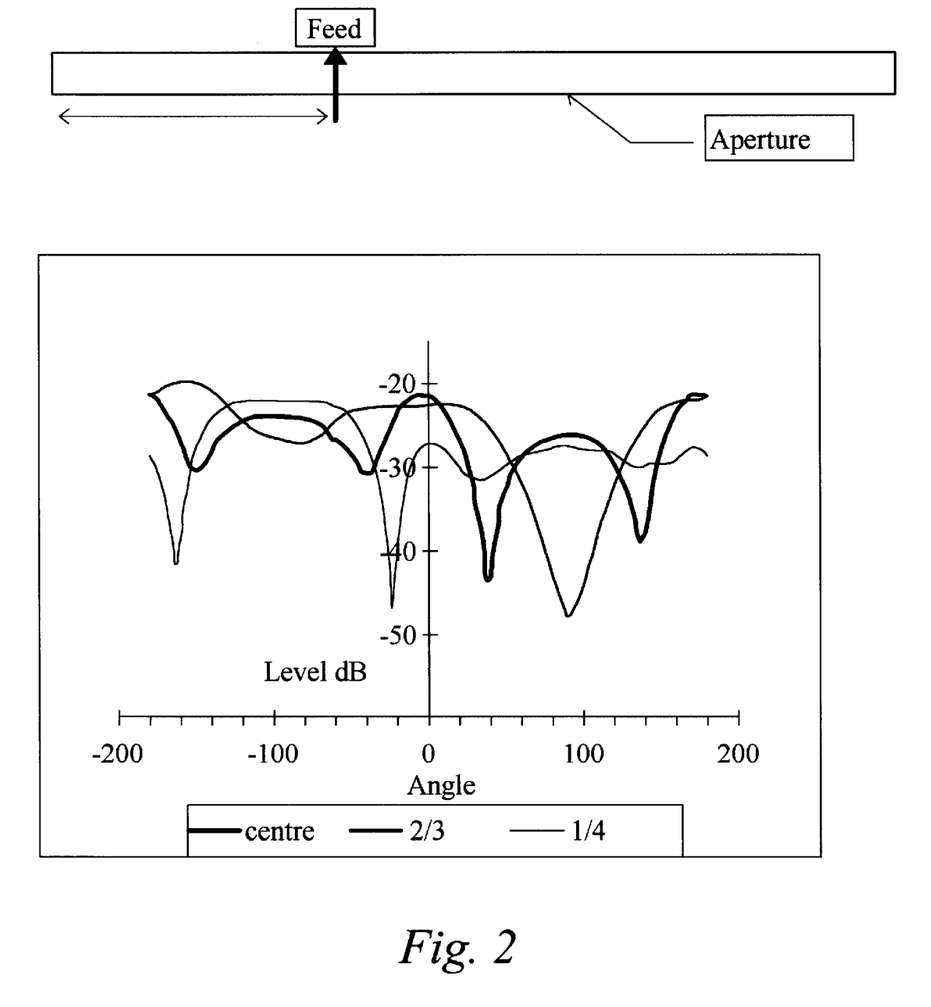
FIG. 2 shows the variation of the azimuthal radiation pattern of a dipole slot with feed position.

If an aperture is excited by electromagnetic waves then the field distribution in the slot can be constructed by a set of orthogonal modes. In practice for a long thin slot, such as in FIG. 1, the functions are sine-type of periodicity an integer divisor of the slot length. For instance in FIGS. 1(a) and 1(b) are illustrated the first two fundamental transverse electric modes, TE10 and TE20. For the long thin slot it is possible to excite one of these modes in preference to the others. Of importance is the frequency of operation. The TE10 mode is resonant when the slot length is ½ wavelength, while the TE20 is resonant for the slot being one wavelength long. However, when the slot is one wavelength long the actual individual mode amplitude will depend upon the excitation. For instance in FIG. 1(c) although the slot is one wavelength long and we might expect the TE20 mode to resonate, the actual field distribution corresponds to the TE10 mode, as the slot is excited in the middle, where the TE20 mode has a minimum and therefore coupling to this mode is near zero. Moving the feed to a position one quarter of the length of the slot from one end, as in FIG. 1(d), excites both the TE10 and TE20 mode, with an asymmetrical aperture field distribution. Note that the higher order modes have an insignificant effect as they are below resonance (i.e. below cut-off). To illustrate this more fully the measured change in radiation pattern with feed position of a long thin slot is shown in FIG. 2. Thus a single feed can be employed to generate two modes.

As will now be described, it is possible to use these concepts to design a multiband diversity screen antenna.

Figure 3:
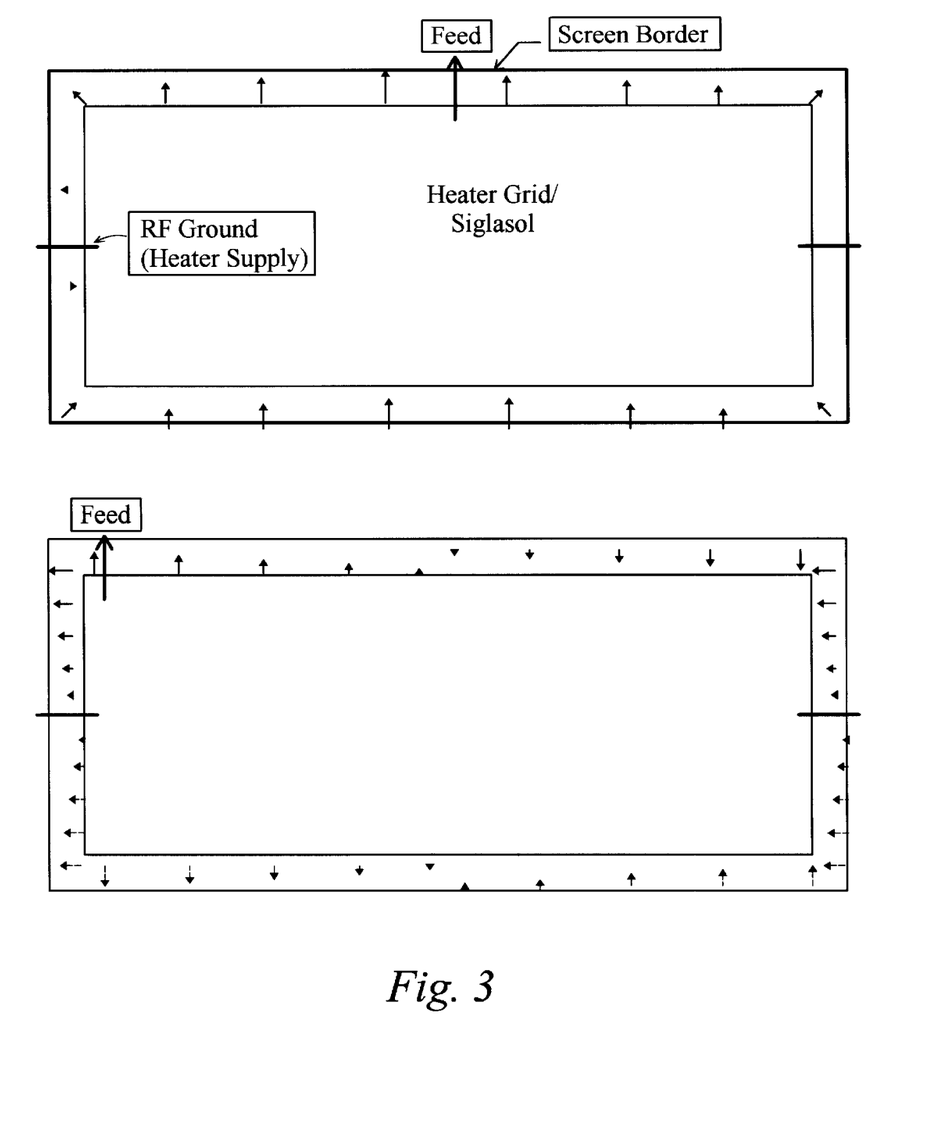
FIG. 3 is an illustration of the aperture field distribution for a screen antenna as a function of feed position.

A slot antenna can be formed on the windscreen of a car as outlined in FIG. 3. A glass screen is fixed in place in a metallic aperture or frame in the vehicle body, forming a conductive margin. Usually the screen would be front or rear window as these are fixed. A long thin electrical slot is then formed between the frame and a conductive area on the screen which does not extend to the edge thereof. This may be an electrical transparent coating integrated into the screen or alternatively a grid pattern can be used, such as those used for heated screens. In the case of a gridded area it may be necessary to place additional orthogonal wires (i.e. vertical wires in the case of a horizontal rear screen heater grid) to improve the approximation, i.e. to reduce coupling across the grid loading the slot modes. This will be dependent on the pattern of the screen heater, and it is possible no additional wires may be needed in some instances.

For a rear screen of a typical saloon car the slot length is such as to support two modes, the TE10 and the TE20 (i.e. the loop length is two wavelengths) at FM frequencies (100 MHz). When a heater grid is used DC supply wires must be accommodated, which cut across the slot. If these are placed symmetrically in the middle of the sides as shown in FIG. 3, then the TE10 and TE20 modes can still be excited, as the heater wires cross at 'nulls'—i.e. they do not load the modes significantly. Indeed they can be considered as shorting out the slot at these points so that the long thin slot of FIG. 1 effectively is bent into a U-shape. However it must be remembered the aperture fields can couple across the wires and excite fields in the lower half of the screen, which may need to be considered. Of course if no crossing wires are needed (or can be made high impedance by the use of RF chokes in the heating circuit), the nulls of the T10 and TE20 modes can be placed in various positions depending upon the feed conditions. This means that an orthogonal TE10 ('TE01') mode may be excited, i.e. two TE10 spaced $\lambda/4$ apart. This mode degeneracy indicates more diversity may be possible, but current discussion will be restricted to the common case of a heated rear window requiring heater wire connections as in FIG. 3.

In FIG. 3 it is seen that the TE10 mode has a maximum at the centre of the slot, while the TE20 has a maximum at the corners. Hence feeding the slot in one of these positions with a voltage probe will excite one mode in preference to the other. Placing the feed intermediate these two positions will excite both modes and the radiation pattern will differ depending upon which combination of the modes is excited, giving pattern diversity. At higher frequencies the slot is effectively longer and hence more than one mode can be excited. This leads to a greater variation in excitation and hence pattern diversity i.e. at UHF the slot can be excited at various points $\lambda/4$ apart generating different patterns.

Figure 4:
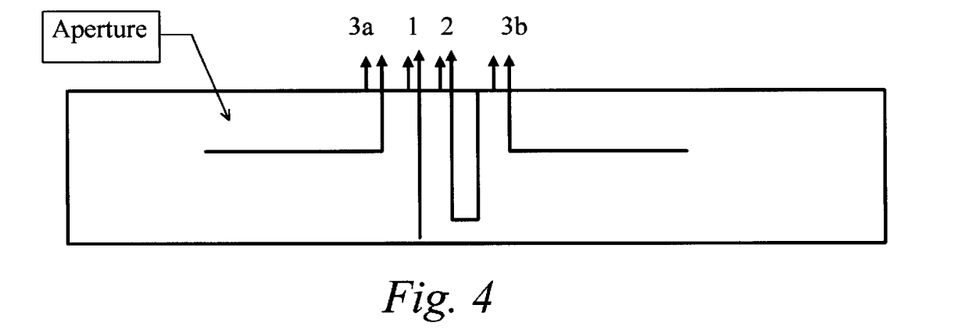
FIG. 4 shows a number of feed arrangements.

The mode content of the aperture field depends also upon the type of feed used to excite the slot. Several types of feed are possible. In FIG. 4 three feeds are illustrated:

1. Voltage probe. Here an unbalanced feed cable is connected orthogonal to the slot, with the cable ground connected to the outside of the slot (vehicle ground) while the inner is connected to the inside edge of the slot diametrically opposite the ground connection. Here the feed voltage is equal to the aperture field voltage at this point. Note for a heater grid the feed will need to be DC isolated, using a series capacitor. Alternatively the connection to the inner area may be via a capacitive pad to provide isolation.
2. Current probe. Here the inner conductor of the feed cable is wound in the aperture and connected back to the vehicle ground. This forms a magnetic coupling to the aperture field.
3. Coplanar line probe. Here the inner conductor is extended along the centre of the slot forming a coplanar transmission line, effectively giving a capacitive voltage feed. However as it is a distributed feed the response at higher frequencies to higher order modes may differ from that of the simple voltage probe and indeed diversity may be achieved simply by feeding in the opposite direction along the slot (i.e. 3a and 3b).

Figure 5:
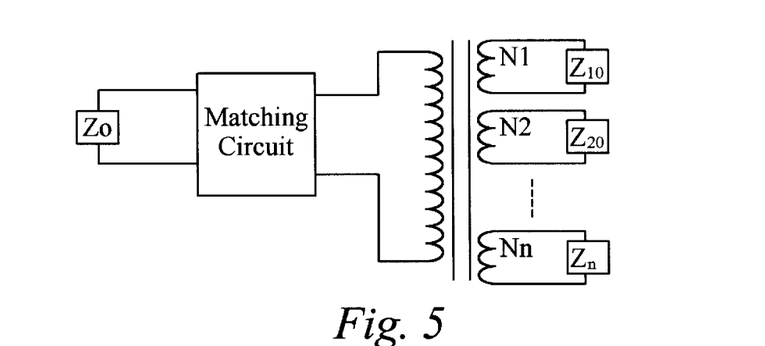
FIG. 5 is an equivalent circuit of an antenna according to the invention.

The above indicate methods of coupling a feed line into the slot. The choice depends upon the position. The feed presents an impedance transformer into the slot modes, each slot mode has its own impedance, which is a function of feed position, frequency and mode. For instance at the centre where the TE10 has a maximum its mode impedance is close to that of the feed (50Ω), while the minimum of the TE20 indicates this mode has a low impedance. Using a voltage probe at this point will couple to the TE10 mode efficiently, but not the TE20. Using a current probe the converse can occur. The general condition is outlined by the circuit diagram of FIG. 5. Here at the feed position each mode has a different impedance, Zn. There are an infinite number of modes, but in practice only the lower dominant modes are excited. Here the lower modes will have a significant real part, while the higher order modes are predominately reactive—the real part representing radiation losses. The feed is coupled to each mode by a differing amount, symbolised by the transformer action with the number of turns, Nn, differing according to the amount of coupling to each mode. Finally the source impedance of the system, Zo, is shown connected through a matching circuit. At any feed point any mode can be excited, however the match circuit can only be optimised to match to one mode. However if modes present similar impedances then more than one can be excited. Hence position, matching and the feed type all play a part in deciding the modal contribution, and hence the radiation pattern.

Figure 6:
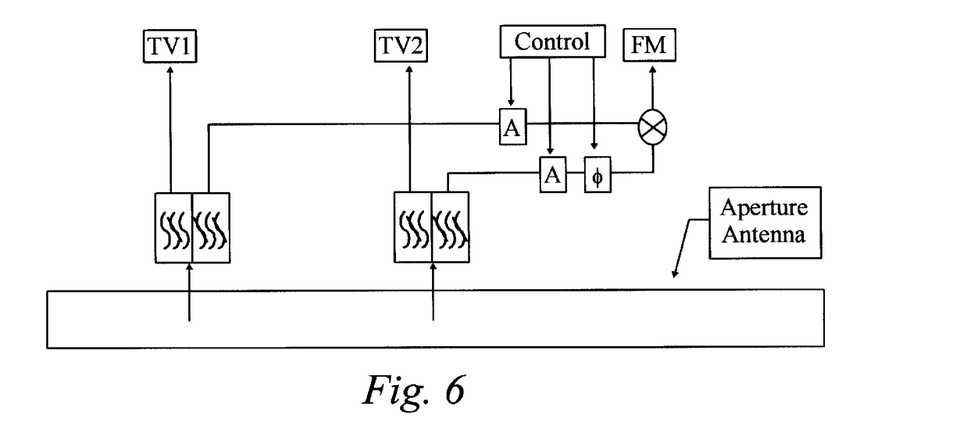
FIG. 6 shows signal splitting circuitry for use in the invention.

FIG. 6 shows how two feeds may be used to extract several different diversity signals from a slot antenna excited in more than one mode. One feed is central of the slot to excite the TE10 mode, and the other is part way along it and positioned to excite principally the TE20 mode. As the modes are orthogonal the two feeds are weakly coupled, i.e. both can be used simultaneously. In this instance they are used both independently and combined together electronically to provide greater diversity. The outputs from the antenna are summed together or differenced. In the simplest case this would provide (Ant 1), (Ant 1+Ant 2) and (Ant 1−Ant 2), the difference being obtained by inserting a 180° phase shift in one line using a $\lambda/4$ line, or an appropriate L-C network, and then summing. In FIG. 6, "A" represents signal Amplitude, and "φ" represents signal Phase, both of which may be adjusted by the "Control."

Also shown in FIG. 6 is the use of filters to separate FM and TV signals; here the same feeds are being used to provide the TV antennas as well as the FM antennas. The situation at higher frequencies becomes more complicated as a large number of modes can be excited. However it is found that if the feeds are spaced apart by more than one wavelength they are invariably independent, i.e. there is minimal loading of one antenna on another.

Above it was noted that wires could be run across the slot at points where there are field minima without affecting the antenna performance. A further development from this is to switch in wires across points of maximum field to load one mode significantly. If the feed is kept fixed, the aperture distribution can be significantly modified, and hence the radiation pattern. For instance, shorting across one corner in FIG. 3 will load the TE10 and TE20 modes to differing degrees, resulting in pattern diversity.

Figure 7:
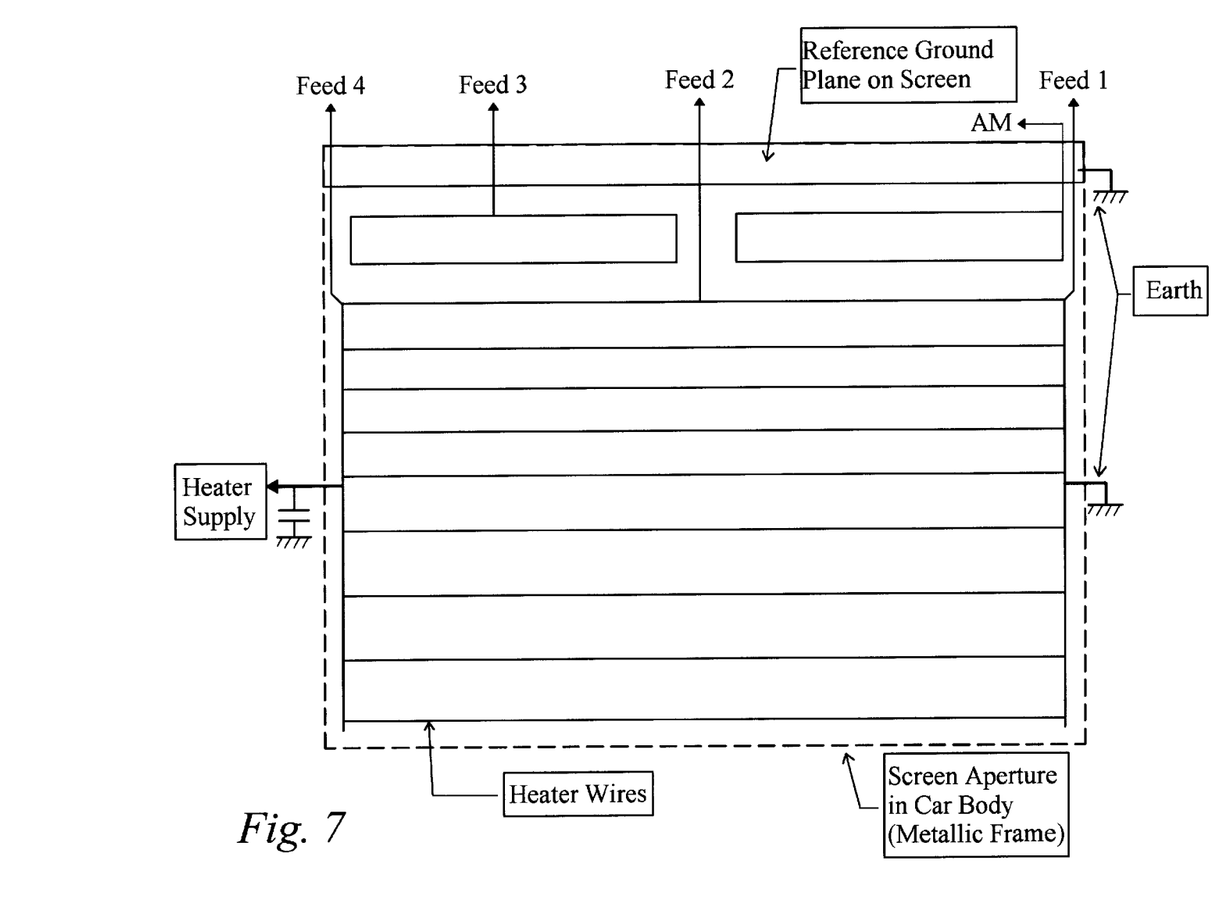
FIG. 7 is an antenna according to the invention.

A typical screen antenna based upon this approach is illustrated in FIG. 7. Here a rear screen with a printed heater grid is modified to provide effectively four FM diversity antennas, one AM antenna, one Band I TV antenna (50 MHz), four Band III/IV/V TV antennas (170–220 MHz, 470–860 MHz) with options for Remote Access (315 MHz/ 433 MHz) and Weatherband (162 MHz).

The slot is formed between the heater grid and the window aperture in the vehicle. The heater grid and its connections are RF grounded by means of a capacitor connected between the window frame and the grid, forming a U-shaped slot the length of which is approximately $\lambda/2$ at 50 MHz. Hence at 100 MHz there are two modes which can be excited.

Feeds 1 and 2 provide two weakly coupled feeds A and B for FM (88–108 MHz), a quarter of wavelength apart. The switching and combining technique shown by FIG. 6 is used to generate pattern diversity. In this instance equal amplitudes but different phase shifts are used in the combining, with values of 0°, 180°, +90° and −90°, to provide A, B, (A+B), (A−B), (A+jB) and (A−jB). The phase shift can be realized by various methods such as switching in additional transmission line lengths or the use of L-C all-pass filters.

Figure 8:
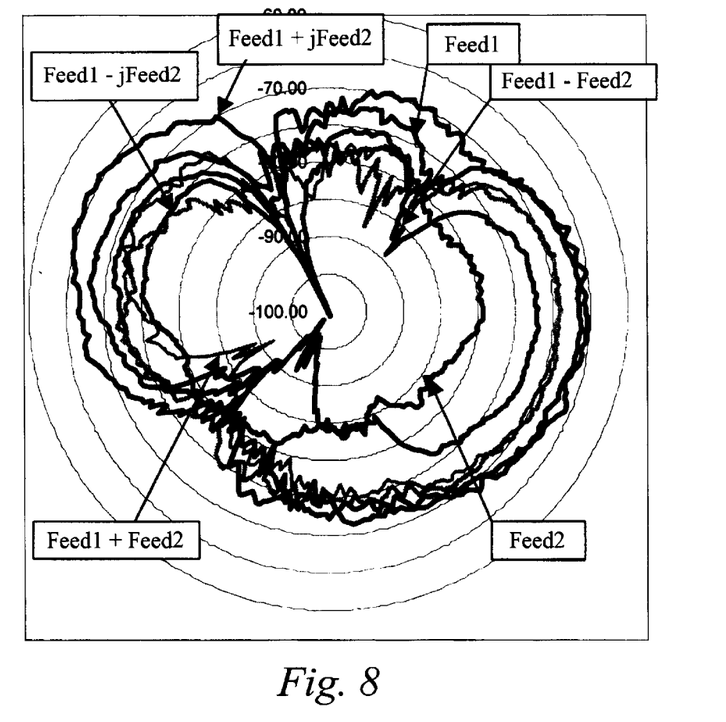
FIG. 8 shows radiation patterns of the antenna of FIG. 7.

FIG. 8 shows the resulting polar radiation patterns; six different radiation patterns are obtained from two feeds. Nulls can be moved or even created, bringing advantages in diversity operation, and simplifying design for diversity.

Feeds 1 and 2 are re-used at other frequencies together with feeds 3 and 4, to provide the TV, remote access and weatherband antennas. Feed 3 is a transmission-line type feed and feed 4 is complementary to feed 1 but at least in this example is utilised only at higher frequencies. These feeds provide additional spatial diversity at the higher frequencies, although some matching may be required on some ports. Simple L-C filtering splits the signals to provide the four TV, weatherband and remote access antennas. These splitter circuits need to be mounted at the antenna feed, hence the provision of a ground plane along the top of the screen. These could potentially be mounted on the inside of the car body but at increased cost. The ground area can be utilised for the mounting of amplifiers, diversity control electronics etc., minimising the number of cables coming off the screen. At 50 MHz there is only one mode, hence no diversity is possible although one antenna can be provided via feed 2. Finally the slot cannot be used for AM as it is too short at these frequencies (<2 MHz). An AM antenna is provided by the second pair of lines in the second top half of the slot to complement the wire pattern of Feed 3. The result is a simple wire pattern, which can be printed on the screen for ease of production, and is visually pleasing yet provides nearly all of the antenna requirements of the modern vehicle designer. This embodiment also demonstrates an incidental advantage over known systems in which the grid itself is used as an antenna. In such systems an expensive coil is needed to provide RF isolation of the grid from the car body whilst still permitting the supply of heater current. Here because the grid is RF grounded rather than RF isolated, only an inexpensive capacitor is required.

Figure 9:
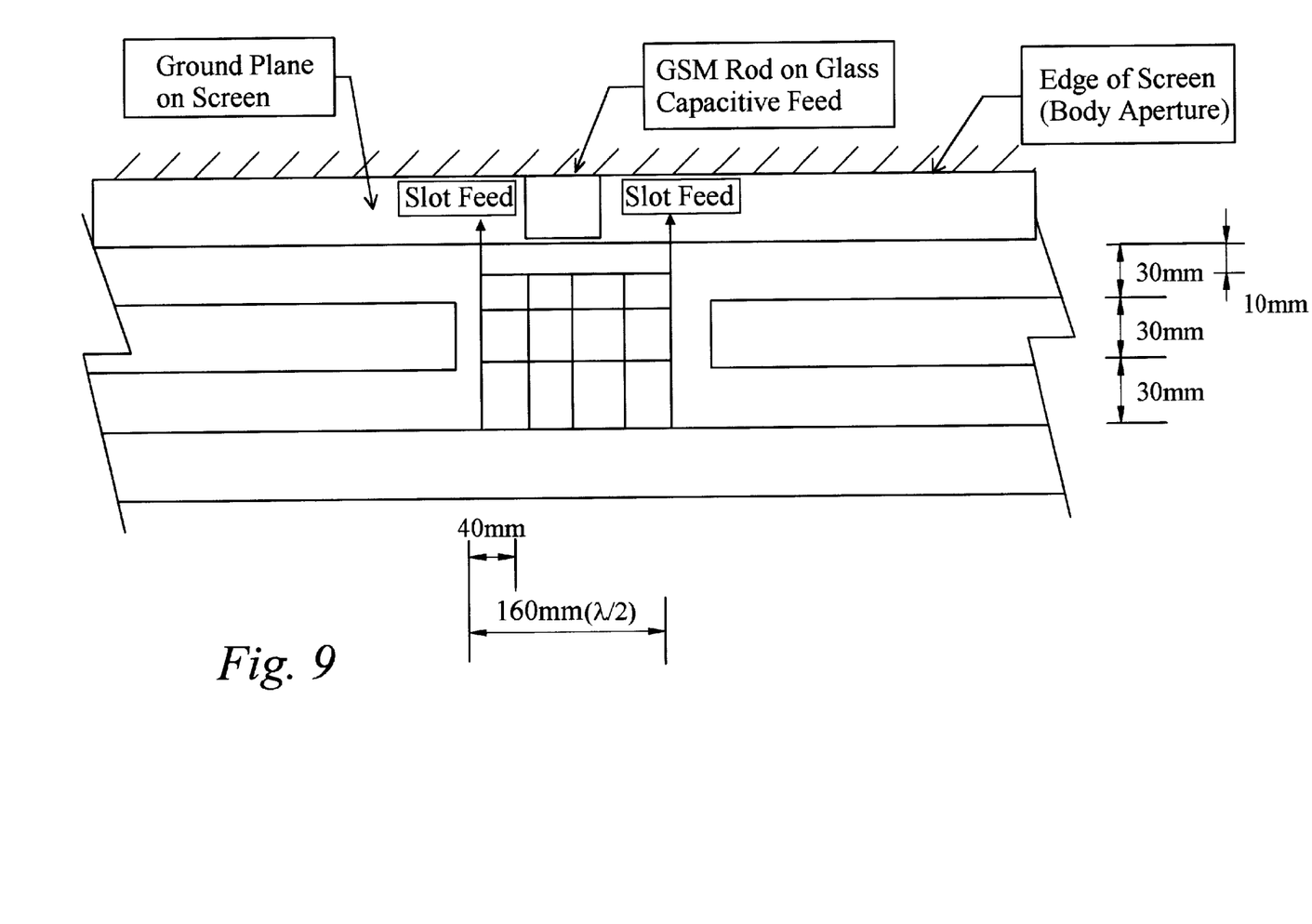
FIG. 9 shows another antenna according to the invention.

Mobile phones are required to transmit as well as receive. Current digital phone technology requires the transmission of quite high RF peak powers (8 W at the antenna). Correspondingly there are concerns about the level of RF radiation inside the passenger compartment. A usual arrangement for the mobile phone antenna is a monopole rod antenna placed centrally on the roof towards the rear screen, or indeed placed on the rear screen, using a capacitive coupling through the glass. In this instance a grid is usually placed near the base of the mobile phone antenna, to increase the local ground, reducing radiation into the car. This conflicts with the need to provide an aperture near the edge of the screen for the diversity slot antenna. However the frequencies involved are an order of magnitude apart and a compromise can therefore be reached as illustrated in FIG. 9. Here the slot width is reduced by a local grid, which connects to the central conductive area (i.e. heater grid). The grid width is approximately $\lambda/2$ at the mobile phone frequency (900 MHz or 1800 MHz typically). The slot width at the top is sufficient such that the grid does not short the slot, but will introduce a small capacitive loading. In practice a 10 to 20 mm gap appears to have little effect on the slot modes at FM frequencies. FM feed can be made by connecting to the grid, as indicated in FIG. 9. Here two feeds as shown either side of the phone antenna base. Although each gives a similar antenna pattern there are advantages in that one can be used for FM and one for TV, easing the circuit functions in splitting the bands.

What is claimed is:

1. A road vehicle antenna comprising a slot defined by an aperture in an electrically-conductive structure of a vehicle body and a further electrically-conductive structure disposed within said aperture, the antenna having a plurality of antenna feeds electrically coupled to the slot, wherein at least one of said antenna feeds is coupled to the slot at a position where a first excitation mode of the slot and at least one higher-order excitation mode of the slot each have a non-null value, the antenna also comprising controllable combining means for controllably combining said antenna feeds so that in use the antenna exhibits a number of selectable radiation patterns in excess of the number of feeds.

2. The antenna of claim 1, wherein the slot is of a length equal to one or one-half wavelength of the first excitation mode.

3. The antenna of claim 1, wherein the slot is U-shaped.

4. The antenna of claim 1, wherein the at least one of the antenna feeds is coupled to the slot at a position approximating the position at which the at least one higher-order excitation mode has a maximum value.

5. The antenna of claim 1, wherein conductors of said antenna feeds are electrically conducted to an inside edge of the slot.

6. The antenna of claim 1, wherein one or more of said antenna feeds is reactively (capacitively or inductively) coupled to the antenna.

7. The antenna of claim 1, wherein the at least one antenna feed is electrically connected to the slot at a position where TE10, as the first excitation mode of the slot, and TE20, as the at least one higher-order excitation mode of the slot, each have a non-null value.

8. The antenna of claim 1, wherein the controllable combining means includes a control means and a means for summing and/or differencing at least two of said antenna feeds.

9. The antenna of claim 8, wherein the controllable combining means comprises means for phase-shifting at least one of said antenna feeds.

10. The antenna of claim 1, comprising means for short-circuiting a portion of the slot to load an excitation mode.

11. The antenna of claim 10, wherein the short-circuit means comprises a conductor bridging the slot between the electrically-conductive structure and the further electrically-conductive structure.

12. The antenna of claim 10, wherein the short-circuit means is disposed at a position of maximum field strength in the slot.

13. The antenna of claim 1, wherein the further electrically-conductive structure comprises a conductive region or pattern carried by a dielectric substrate.

14. The antenna of claim 13, wherein the substrate forms a window or body panel.

15. The antenna of claim 1, wherein the controllable combining means includes means for open-circuiting one or more of said antenna feeds.

16. The antenna of claim 14, wherein the substrate comprises a ground plane in which signal splitting, filtering, processing or conditioning circuits are disposed.

17. The antenna of claim 1, configured for, at least, FM signals, and also including a separate portion for receiving broadcast AM signals.

* * * * *